(12) United States Patent
Zook et al.

(10) Patent No.: US 6,246,638 B1
(45) Date of Patent: Jun. 12, 2001

(54) FIBER-OPTIC VIBRATION SENSOR BASED ON FREQUENCY MODULATION OF LIGHT-EXCITED OSCILLATORS

(75) Inventors: J. David Zook, Golden Valley; William R. Herb, Minneapolis, both of MN (US); David W. Burns, San Jose, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/281,388

(22) Filed: Mar. 30, 1999

(51) Int. Cl.$^7$ .................................................. G02B 6/00
(52) U.S. Cl. ................................................ 367/140
(58) Field of Search ................................. 367/140, 149; 385/12; 250/227.16; 73/655

(56) References Cited

U.S. PATENT DOCUMENTS

| | | |
|---|---|---|
| 4,345,482 | 8/1982 | Adolfsson et al. . |
| 5,379,639 | 1/1995 | Hulsing, II et al. . |
| 5,396,798 | 3/1995 | Frische ............................. 73/517 R |
| 5,426,981 | * 6/1995 | Cook et al. ............................ 73/655 |
| 5,559,358 | 9/1996 | Burns ................................. 257/431 |
| 5,581,930 | 12/1996 | Langer ..................................... 43/17 |
| 5,589,937 | 12/1996 | Brininstool .......................... 356/352 |
| 5,637,865 | 6/1997 | Bullat ............................. 250/227.14 |
| 5,808,210 | 9/1998 | Herb .................................. 73/862.59 |
| 5,917,226 | 6/1999 | Chan .................................... 257/415 |

FOREIGN PATENT DOCUMENTS 0505177   9/1992   (EP) .

OTHER PUBLICATIONS

G. Schroopfer, M. de Labachelerie, S. Ballandras. "2D Silicon Micromachined Accelerometer With Optically Multiplexed Distant Readout." *MOEMS97 Technical Digest*, Nov. (1997): pp. 126–131. Published for the International Conference on Optical MEMS and Their Applications at Nara, Japan.

M. Pedersen, W. Olthuis, Piet Bergveld. "An integrated silicon capacitive microphone with frequency–modulated digital output." *Sensonr and Actuators*, A 69 (1998): pp. 267–275.

* cited by examiner

Primary Examiner—Daniel T. Pihulic
(74) Attorney, Agent, or Firm—John G. Shudy, Jr.

(57) ABSTRACT

A sensor device for detecting vibration, including a light source for providing a laser light, a first optical fiber connected to the source for transmitting the laser light, an oscillator positioned to receive the transmitted laser light and adapted to reflect the light as a frequency modulated light; a second optical fiber positioned to capture the frequency modulated light to transmit the frequency modulated light; and a frequency modulated discriminator for receiving the frequency modulated light from the second optical fiber and producing a signal responsive of vibration of the oscillator. In a preferred embodiment, the frequency modulated discriminator further includes a frequency meter for determining the average number of cycles per unit time to provide a second signal responsive of the temperature of the oscillator. The optical fibers may be a pair of different fibers positioned for transmitting the laser light and the frequency modulated light respectively, or the same fiber positioned for transmitting both the laser light and the frequency modulated light. In this latter embodiment, the device further includes a beam splitter to direct the frequency modulated light to the discriminator. The preferred oscillator includes a microchip having a microbeam mounted on a thin silicon cantilever such that deflection of the beam perpendicular to the plane of the microchip changes the tension in the microbeam to change its resonant frequency. Also preferred is a microbeam including a thin metal deposit to create a bimorph structure.

8 Claims, 5 Drawing Sheets

FIBER-OPTIC VIBRATION SENSOR BASED ON FREQUENCY MODULATION OF LIGHT-EXCITED OSCILLATORS

The Government may have rights in this invention pursuant to Contract No. N0001-96-C-0373, awarded by the Department of the Navy.

FIELD OF THE INVENTION

The present invention relates to a vibration sensor using FM technology. More particularly the invention relates to a vibration sensor using a strain-sensitive oscillator in which resonant microbeams are driven and sensed by a single mulimode optical fiber.

BACKGROUND OF THE INVENTION

Vibration sensors can be useful for monitoring the condition of rotating machinery, where overheating or excessive vibration could indicate excessive loading, inadequate lubrication, or bearing wear. Commercial vibration sensors use a piezoelectric ceramic strain transducer attached to a metallic proof mass in order to respond to an externally imposed acceleration.

It is also possible to use a MEMS accelerometer with a capacitive output such as the one made by Analog Devices. These devices provide an acceleration output directly and do not require FM demodulation.

However, alternative means for measuring vibration, which would have decreased cost, easier manufacturing techniques, more reliability and additional features, are always desired. It would be important to develop new sensors which would overcome some of the shortcomings of current sensors, particularly by offering the many advantages of fiber optic interconnections. Of particular interest are sensors which have immunity from EMI, are intrinsically safe, and permit operation at much higher temperatures than the prior art.

Also, since vibration is often measured or monitored to determine or anticipate defects and/or machine wear, it would be desirable to measure the temperature of the object being monitored since an increase in heat often indicates increased friction or stress that may in time lead to failure of the object.

Accordingly, it would be of great advantage in the art if an improved vibration sensor could be provided.

It would be another great advance in the art if the vibration sensor would also permit measurement of other physical properties such as the temperature of the vibrating element.

Other advantages will appear hereinafter.

SUMMARY OF THE INVENTION

It has now been discovered that the above and other objects of the present invention may be accomplished in the following manner. Specifically, the present invention provides a sensor device for detecting vibration. For the first time, a strain-sensitive resonator is used as a vibration sensor. The vibration sensor of the present invention makes use of acceleration-sensitive devices having their output in the form of a frequency that depends on the acceleration to which they are subjected. Such devices are known in the art as resonant acceleration sensors, or resonant accelerometers, which belong to the broad class of resonant sensors. Resonant sensors make use of a strain-sensitive resonant element, or resonator, preferably having high mechanical 9 so that its resonant frequency is well defined. Examples of srain-sensitive resonators are clamped-clamped bems or thin diapragms. The resonator is attached to or built on to a sensitive structure so that an externally imposed variable such as presure, temperature or acceleration acts to change the natural vibration frequency of th resonator. In a common embodiment of a resonant sensor, the resonator is used to determine the frequency of an oscillator which generates an AC output at a frequency characteristic of the resonator. An external power source is required to maintain the vibration of the resonator and to provide an oscillator output to an external load or detector. The extermal power source can be electrical or optical and the oscillator output can be either an AC electrical signal or it can be in the form of intensity modulated light.

In a resonant accelerometer the resonator is attached to or is part of a structure that deforms or bends in resonse to an external acceleration. An example is a flexible member, or flexure, attached at one end to a more massive member called a proof mass, and at the other end to an external frame or structure which is subjected to acceleration. A resonant element such as a clamped-clamped microbeam is mounted on the flexure. When subjected to an external acceleration, the inertia of the proof mass causes themotion of the proof mass to lag the motion of the frame and causing bending of the flexure which in turn changes the tension in the microbeam and therefore its resonant frequency much as the tightening of a string of a musical instrument change its pitch.

In particular, the invention makes use of a resonant accelerometer in which vibration of the structure causes FM modulation of the oscillator output which can be detected by an FM discriminator circuit. In a preferred embodiment, the oscillator is powered optically by means of an optical fiber and the output is in the form of light with an intensity modulated at the frequency of the strain-sensitive resonator.

The device of this invention includes a light source, such as a laser, which is reflected off the strain-sensitive oscillator, returning as frequency modulated light and converted to an electrical signal by a photodetector. This elecrical signal is then demodulated in a FM discriminator to produce an output signal representative of the vibration.

A frequency meter may also be used to determine or count the average number of cycles per unit time to provide a second signal responsive of the temperature of the oscillator.

The laser light and the frequency modulated light reflected from the oscillator are transmitted from the laser light source to the oscillator and back to the frequency modulated discriminator by optical fibers. A pair of optical fibers may be used, or the same fiber may both transmit the laser light to the oscillator and capture the reflected frequency modulated light for detection and transmission to the demodulator.

The preferred oscillator includes a microchip having a microbeam mounted on a thin silicon cantilever such that deflection of the beam perpendicular to the plane of the microchip changes the tension in the microbeam to change its resonant frequency. Also preferred is a microbeam including a thin metal deposit to create a bimorph structure. Other strain-sensitive oscillators may be used as well.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
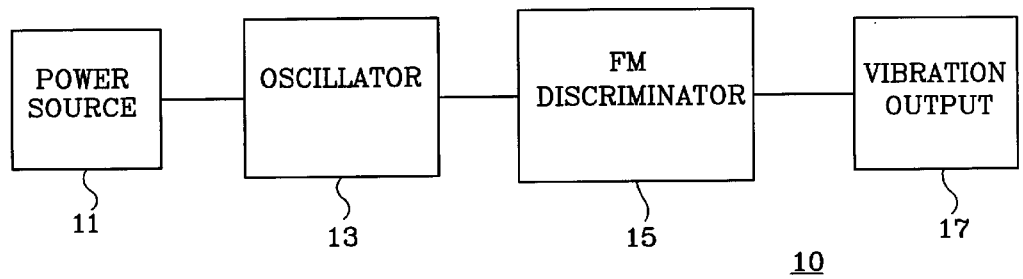
FIG. 1 is a block diagram schematically illustrating the device of the present invention in its most basic form.

Turning now to the drawings, FIG. 1 illustrates the simplest form of the invention in a block diagram. The device, 10 generally, requires a power source 11 to maintain the oscillator 13 output. The frequency of the oscillator is determined by a strain-sensitive resonator built into a structure that bends or deforms in response to acceleration, causing the oscillator frequency to change. One type of resonant accelerometer is shown in commonly held Frische U.S. Pat. No. 5,396,798, the disclosure of which is incorporated herein by reference. Vibration of the structure causes FM modulation of the oscillator frequency and ina spectrum analyzer appears as sidebands of the oscillator frequency. The vibration can be detected with conventioal FM discriminator circuits.

Nove of the devices in the above patent specifically incorporate light-powered oscillators. A simple and preferred embodiment of the present invention which has been demonstrated makes use of light-powered strain-sensitive oscillators as described in commonly owned Burns et. al. U.S. Pat. No. 5,559,358, which is also incorporated herein by reference. The resonator is a clamped-clamped microbeam which is optically self-resonant, i.e., it spontaneously vibrates at its characteristic frequency when illuminated by light of the proper wavelength and of sufficient intesity. In additoin the vibrating microbeam modulates the intensity of the reflected light, providing a means of continuously determining the vibration frequency. The microbeam can be incorporated into structures responsive to pressure, temperature or acceleration, examples of which are described in the above referenced Bums et. al. patent.

Figure 2:
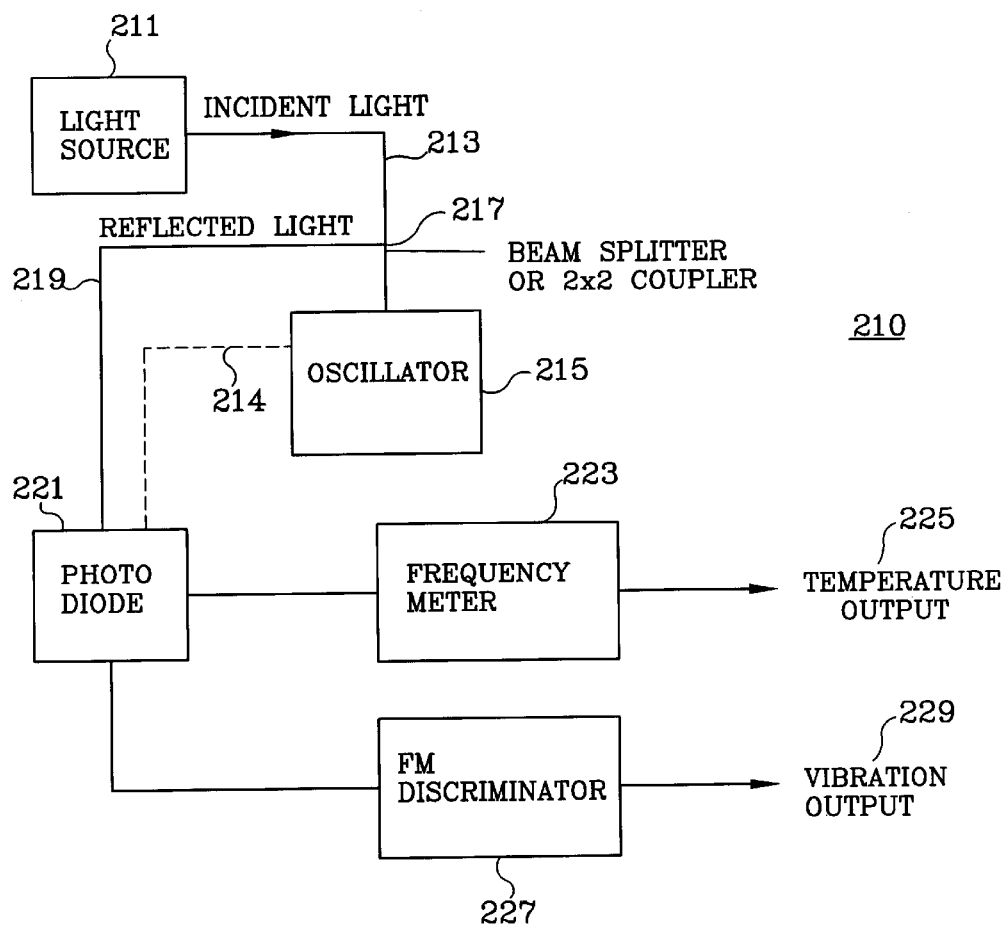
FIG. 2 is a block diagram schematically illustrating the device of the present invention in an optical form.

FIG. 2 illustrates the optical embodiment of this invention in its simplest form in a block diagram. The device, 210 generally, includes a light source 211, such as a 780 nm laser of the type used in compact disk players, inputting a laser light into a fiber optic cable 213, which in turn directs light to the oscillator 215, described in greater detail below, but operating, for example, by producing changes in the tension in a resonant microbeam to thereby change its resonant frequency. Vibration causes FM modulation of the resonant frequency, and appears as sideband of the oscillator frequency. This can be detected with conventional analog FM demodulation circuits.

As light is reflected off the oscillator 215, it returns via cable 213 and beam splitter 217 into cable 219 to a photodiode 221 which converts the reflected light from the oscillation to an electrical output. Alternatively, the FM modulated light may be transmitted back through cable 214 directly to the photodiode 221. In either case, the light carried by cable 214 or 219 has acquired FM modulation of the resonant frequency. FM receiver 227. FM receiver 227 produces a data output of the vibration measured by demodulation of the FM signal coming from oscillator 215, via photodiode 221, and is displayed as output 229. In addition, because the average carrier frequency is dependent on temperature, frequency meter 223 determines the average frequency over a period of time, such as cycles per second or the like, and thus the temperature of the oscillator is measured and displayed as output 225.

Figure 3:
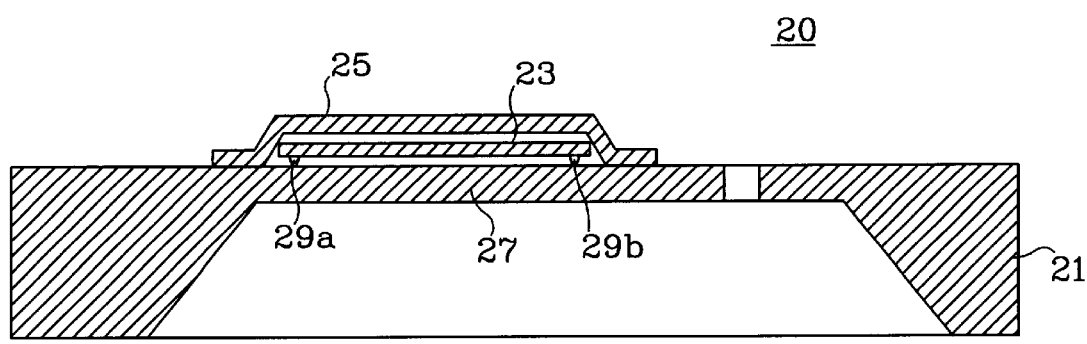
FIG. 3 is a schematic cross sectional view of one embodiment of the present invention, showing a polysilicon microbeam fabricated on a silicon cantilever paddle, all in accordance with the invention.

The simple cantilever paddle geometry, 20 generally, shown in FIG. 3 was used to demonstrate the FM vibration sensor concept. The sensor chip 21 includes a resonant microbeam 23 inside a vacuum-sealed cavity 25 mounted on a thin silicon "paddle" 25 that provides stress isolation from packaging-induced stress. A vibrating element such as microbeam 23 is attached to a flexible substrate 29a and 29b at both ends, to provide an element having a resonant frequency that changes in response to bending of the flexure. The vibrating element acts as a resonant strain gauge, or, simply, a resonant gauge.

As noted in the above referenced Burns et. al. patent, the microbeams are fabricated first using 5 depositions (2 polysilicon, 3 silicon oxide) and seven masking layers. One poly layer forms the resonant microbeam, while the second forms an integral vacuum enclosure. The proof mass/ suspension is then formed with a combination of deep RIE and wet etching. A buried boron-doped layer establishes the final flexure thickness.

Vibration of the substrate in a direction perpendicular to the plane of the flexure causes bending of the flexure, thereby modulating the frequency of the resonant gauge. The vibration signal, or acceleration as a function of time, is then obtained by FM demodulation of the output signal V(t) as described above.

The vibration response is related to the intensity of the FM sidebands through the modulation function using conventional communication theory. In the case of a sinusoidal vibration, we see:

$$y = y_o \cos \omega_v t$$

where y is the effective displacement of the proof mass and $\omega_v$ is the angular frequency of vibration. The acceleration of the proof mass is then given by:

$$a(t) = \ddot{y} = -\omega^2 y = a_o \cos \omega_v t$$

The frequency of the resonant strain gauge changes adiabatically in response to an acceleration a(t)

$$\omega_i(t) = \omega_o + \Gamma a(t)$$

where $\Gamma$ is the acceleration sensitivity. The instantaneous phase is given by:

$$\phi(t) = \int_o \Gamma a(t) dt = -\Gamma \omega_v y_o \sin \omega_v t$$

The phase modulation index, often denoted by $\beta$, is given by the peak phase deviation: $b = \Gamma \omega_v y_o = \Gamma a_o / \omega_v$. For the case of small vibration amplitude, $\beta << \pi/2$. The oscillator output is assumed to be sinusoidal:

$$e(t) = A\cos(\omega_v t = \beta \sin \omega_v t \approx A \sin \omega_o t = A/2\beta \cos(\omega_o + \omega_v) t - A/2\beta \cos(\omega_o + \omega_v) t$$

where the first term is the carrier amplitude and the next two terms are the upper and lower sidebands, respectively. The ration of the singe sideband power to the carrier power is given by:

$$S/C = \beta^2/4 = \Gamma^2 a^2/4\omega_v^2$$

which is the basic equation describing the vibration response. It shows that, for a given acceleration, the sensitivity of the vibration sensor decreases with frequency. This is in contrast with conventional piezoelectric accelerometers whose sensitivity is approximately independent of frequency.

This structure is illustrative of the concepts of the present invention and is not an optimum design. The two most important design parameters are the sensitivity $\Gamma$ and the fundamental natural frequency of the proof mass/suspension system. High sensitivity is desirable to give a low noise floor, while a high value of the suspension frequency is desirable to maximize the bandwidth of the vibration sensor. Unmodified cantilever paddle devices tested have a sensitivity of about 5 Hz/g and a suspension frequency of about 100 kHz.

Adding a discrete mass to the tip of the cantilever can increase sensitivity to 200 Hz/g while reducing the suspension frequency to 10 kHz. To further improve performance, a number of other sensor configurations based on previous RIMS accelerometer structures but improved to detect vibration, have been considered.

In order to demonstrate the efficacy of the present invention, a number of experiments were performed. Specifically, measurements were taken of the vibration response of several paddle-type microstructures having sealed-cavity microbeams. The paddle acts as a combined flexure and proof mass. These devices were used for temperature measurement and were not optimized for vibration. For the optical networks of temperature sensors non-self-resonant devices are used. However, proper choice of the gaps above and below the resonant microbeams results in the optically self-resonant microbeams used for the vibration sensors. The set-up was the same as that used for wafer level testing of temperature and pressure sensors. Measurements were done at the die level using a 780 nm laser of the type used in compact disk players coupled to a multimode (50 $\mu$m core fiber at normal incidence) For vibration testing the silicon die was mounted on the piezoelectric transducer taken from a small electrostatic loudspeaker. The transducer was excited with a signal generator and the amplitude of vibration of the die was calibrated with a laser vibrometer. The response could be measured from 100 Hz to 30 kHz.

Figure 4:
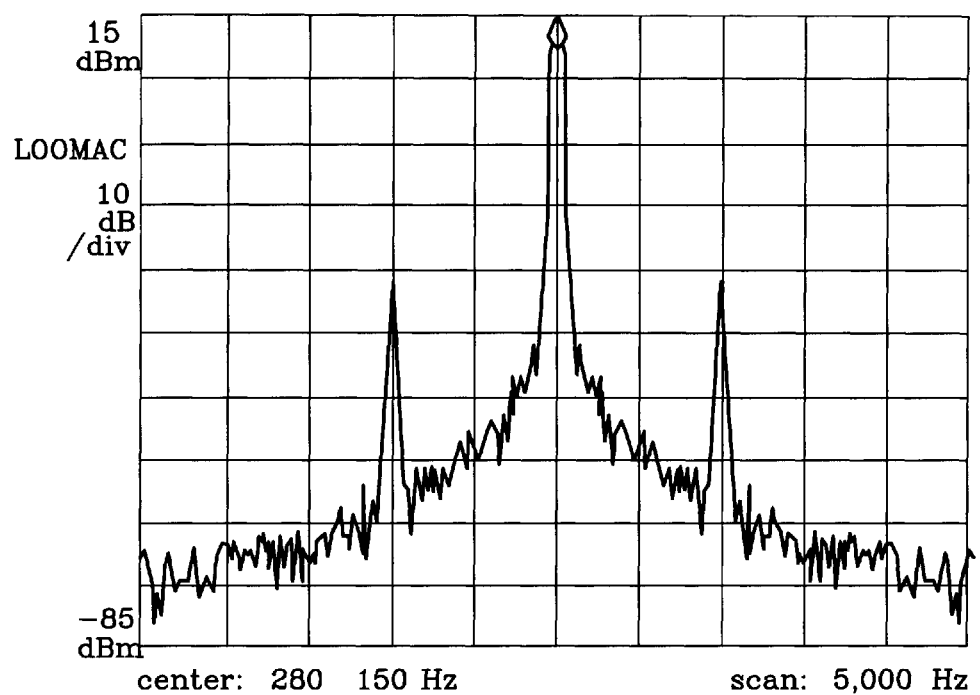
FIG. 4 is a graph showing a spectrum of an amplified signal showing a vibration having been detected as an FM modulated signal.

FIG. 4 illustrates the spectral response of such a temperature sensor having a self-resonant frequency (carrier frequency) of 122 kHz and subjected to a vibration at 1 kHz. The spectrum was averaged for a number of scans so that the noise floor can be clearly identified. The vibration produces two sidebands that are separated from the carrier by the vibration frequency. Their amplitude is proportional to the signal driving the piezoelectric transducer. The amplitude of vibration as measured by the laser vibrometer corresponded to an acceleration of 1.7 m/sec2 or 0.17 g. The fundamental paddle resonance in this device was at 98 kHz. The average value of $\Gamma$ was 6.6 Hz/g as determined from the vibration response between 1 kHz and 20 kHz. With proper design, the sensitivity of the vibration sensor can be enhanced by about two orders of magnitude while maintaining a frequency response to 10 kHz.

Figure 5:
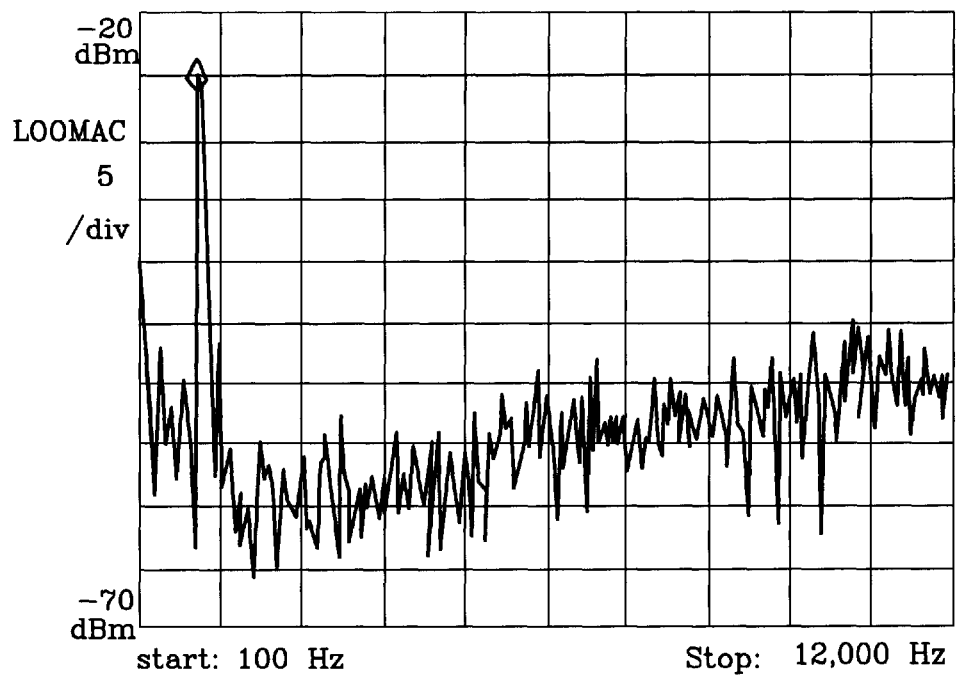
FIG. 5 is a graph showing a spectrum of a signal showing a demodulated signal indicating a vibration having been identified.

The vibration spectrum was also measured directly using a conventional FM discriminator circuit of a Foster-Seeley type designed to operate in the range of our microbeam frequencies. FIG. 5 shows the Foster-Seeley output of a device with a carrier frequency of 244 kHz as measured with a spectrum analyzer. Measurements with a modulation analyzer showed that the modulation was purely FM without detectable AM modulation.

Figure 6:
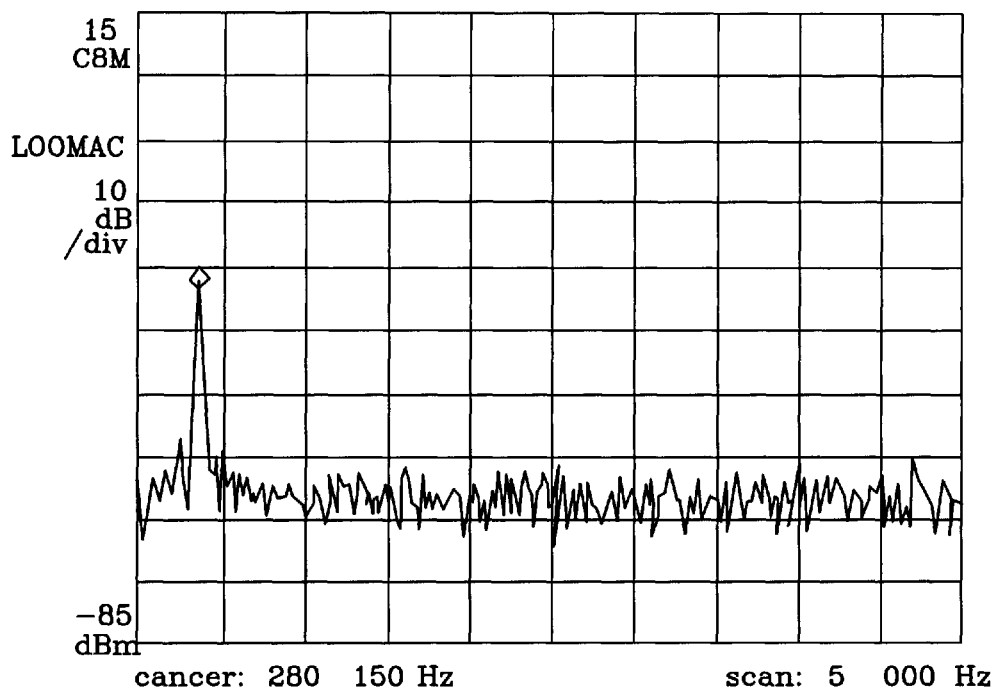
FIG. 6 is a graph showing a spectrum from a detector circuit.

FIG. 6 provides the frequency spectrum of a Foster-Seely detector circuit for a 1 kHz vibration signal applied to a 244 kHz self-resonant microbeam temperature sensor.

The silicon accelerometer structure of the present invention may have a variety of configurations. These structures have an advantage over piezoelectric accelerometers in that significant damping may be introduced via squeeze film damping on the proof mass. If it is assumed that a critical damping ratio between 0.5 and 0.7 can be achieved, then the measurable vibration frequency range may approach one-half the suspension natural frequency range or better. In contrast, piezoelectric accelerometers typically have a measurable frequency range of-one-fifth the suspension natural frequency.

Figure 7A:
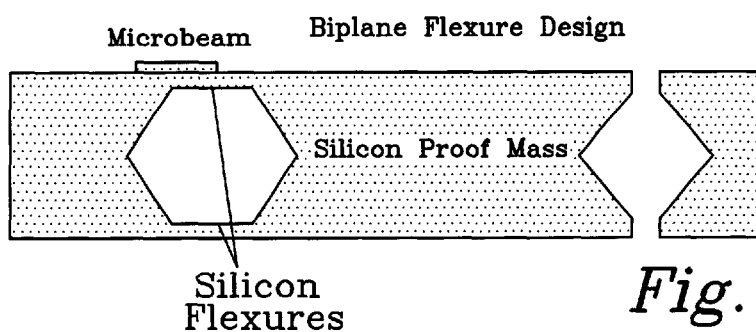
FIG. 7a and 7b are alternative versions of two accelerometer designs.
Figure 7B:
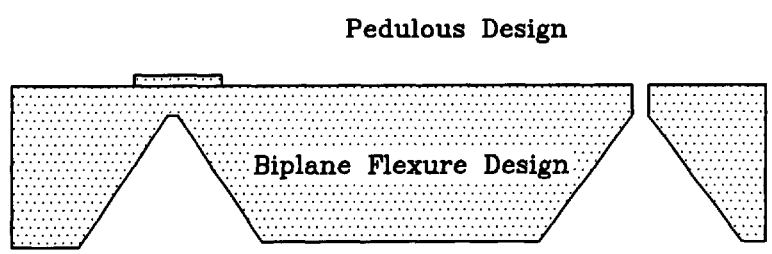

FIGS. 7a and 7b illustrate two versions of accelerometers. Both designs use a silicon proof mass suspended on silicon flexures. The cantilevered configuration in FIG. 7b maximizes sensitivity and minimizes the effect of temperature and packaging stress.

Figure 8:
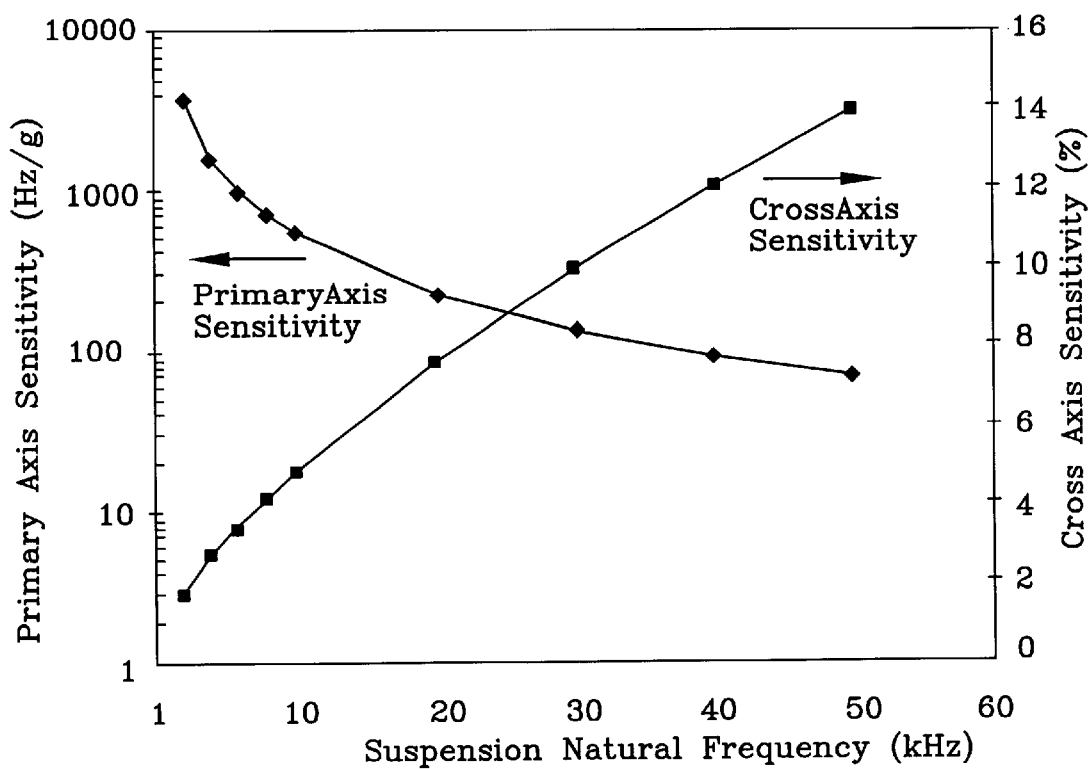
FIG. 8 is a graph showing the calculated primary and cross axis sensitivity versus suspension natural frequencies in an accelerometer.

FIG. 8 demonstrates a design curve of sensitivity versus suspension natural frequency for the pi-plane flexure microstructure shown in FIG. 7a. The suspension flexure thickness was varied from 9 $\mu$m to 70 $\mu$m to vary the suspension natural frequency from 2 kHz to 50 kHz. The cross axis sensitivity increases as the suspension stiffness is increased, though it may be possible to improve the cross axis sensitivity substantially. The upper measurement range will be quite high, on the order of 300 g with a shock limit of 2000–3000 g, and possibly even higher with overrange protection.

Experiments have found that the carrier to noise-floor ratio is the same whether measured with the Foster-Seeley circuit, the modulation analyzer or directly with the spectrum analyzer. The white noise floor as measured by the spectrum analyzer corresponds to the white phase noise of an oscillator and is characterized by an RAV that is inversely proportional to ts. The theoretical relationship between the two representations is derived from the asymptotic form of the expression for oscillator noise for white phase noise. The noise to carrier ratio N/C is the square root of the power ratio as measured with a spectrum analyzer and is typically referred to in dbc/Hz.

While particular embodiments of the present invention have been illustrated and described, it is not intended to limit the invention, except as defined by the following claims.

What is claimed is:

1. A sensor device for detecting vibration, comprising:

a power source for powering an ocsillator, an oscillator having an output signal frequency depending on acceleration;

a frequency modulated discriminator for receiving said output signal and producing a signal responsive of vibration of said oscillator in response to bending of said discriminator by said vibration to change its resonant frequency; and a frequency meter for determining the average number of cycles per unit time to provide a signal responsive of the temperature of said oscillator.

2. The device of claim 1, wherein said frequency modulated discriminator further includes a frequency meter for determining the average number of cycles per unit time to provide a second signal responsive of the temperature of said oscillator.

3. A method for detecting vibration in an object, comprising the steps of:

powering an ocsillator with a power source;

deriving output signal frequency depending on acceleration from said oscillator;

receiving said output signal and producing a signal responsive of vibration of said oscillator using a frequency modulated discriminator in response to bending of said discriminator by said vibration to change its resonant frequency; and determining the average number of cycles per unit time to provide a signal responsive of the temperature of said oscillator.

4. A sensor device for detecting vibration, comprising:

power source means for powering ocsillator means, oscillator means having an output signal frequency depending on acceleration;

frequency modulated discriminator means for receiving said output signal and producing a signal responsive of vibration of said oscillator in response to bending of said discriminator by said vibration to change its resonant frequency; and frequency meter means for determining the average number of cycles per unit time to provide a signal responsive of the temperature of said oscillator means.

5. A sensor device for detecting vibration, comprising:

a power source for powering an ocsillator, an oscillator having an output signal frequency depending on acceleration;

a frequency modulated discriminator for receiving said output signal and producing a signal responsive of vibration of said oscillator, said oscillator including a microchip having a microbeam mounted on a thin silicon cantilever such that deflection of the beam perpendicular to the plane of said microchip changes the tension in said microbeam to change its resonant frequency.

6. The device of claim 1, wherein said microbeam includes a thin metal deposit to create a bimorph structure.

7. A method for detecting vibration in an object, comprising the steps of:

powering an ocsillator with a power source;

deriving output signal frequency depending on acceleration from said oscillator;

receiving said output signal and producing a signal responsive of vibration of said oscillator using a frequency modulated discriminator, said oscillator including a microchip having a microbeam mounted on a thin silicon cantilever such that deflection of the beam perpendicular to the plane of said microchip changes the tension in said microbeam to change its resonant frequency.

8. The method of claim 7, wherein said microbeam includes a thin metal deposit to create a bimorph structure.

* * * * *